A. N. E. BOOS.
SERVICE CHECK AND RECEIPT.
APPLICATION FILED APR. 25, 1918.
1,393,489. Patented Oct. 11, 1921.
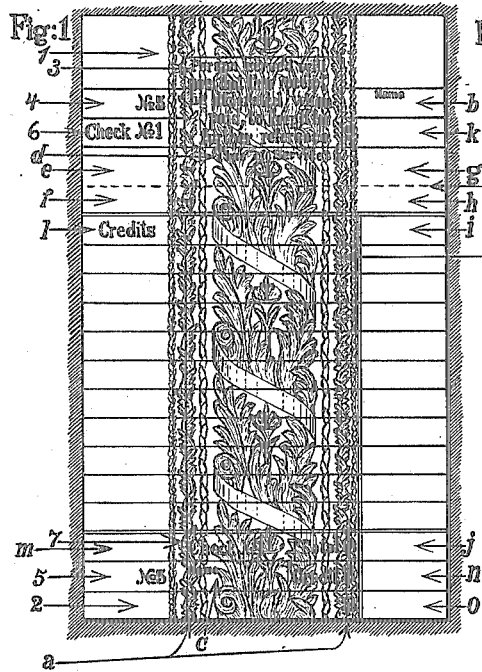
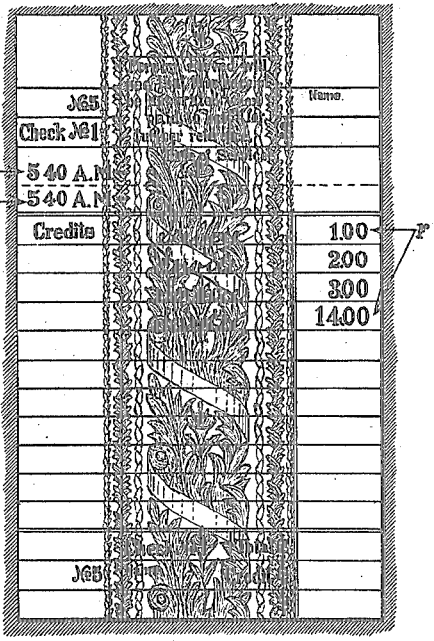
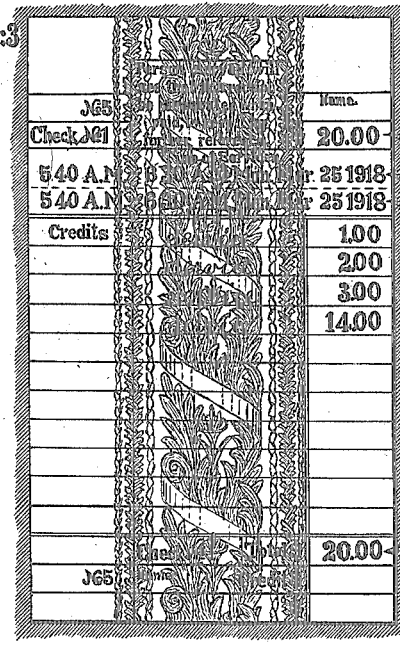
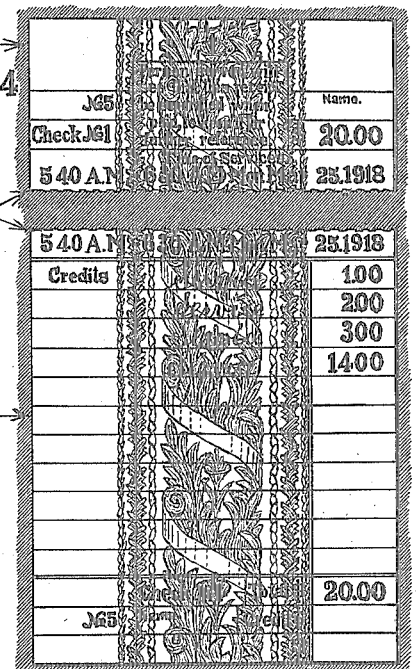
Inventor
August N. E. Boos.
By his Attorney

UNITED STATES PATENT OFFICE.

AUGUST N. E. BOOS, OF NEW YORK, N. Y.

SERVICE CHECK AND RECEIPT.

1,393,489.  Specification of Letters Patent.  Patented Oct. 11, 1921.

Application filed April 25, 1918. Serial No. 230,658.

*To all whom it may concern:*

Be it known that I, AUGUST N. E. Boos, a citizen of the German Empire, and a resident of the borough of Manhattan, in the county, city, and State of New York, have invented certain new and useful Improvements in Service Checks and Receipts, of which the following is a specification.

The present invention relates to improvements in service checks and receipts, and particularly to such checks and receipts for use in stores, restaurants or other businesses. An object of the invention is to provide such a device as to enable an accurate record of the services rendered to be kept, and also will show the time and date of the services in such manner as to protect the guest or customer and the proprietor against any fraud, mistakes, over-charges and the like, which practices are quite possible with the usual form of checks.

Another object of the invention is to provide a receipt portion for the customer or guest upon which the time of the service is recorded, and also showing the amount spent at the place of the expenditure, thereby providing a record for any future reference that the customer or guest may wish to make with regard to the services. A still further object is to provide on the check a perforation to enable the check portion to be readily removed, upon payment of the check, from the body portion, and to provide a protective design printed upon the check in such manner as to disclose any erasures or changes that are made in the check. I also propose to provide such design in light colors, so that it will not obscure the printed matter and entries upon the check, and also I propose, by such design, to add to the attractive appearance of the check, thereby advertising and giving distinctiveness to the restaurant or other establishment issuing the check.

With these and other objects in view an embodiment of my invention is shown in the accompanying drawings and this embodiment will be hereinafter more fully described in reference thereto and the invention will be finally pointed out in the claims.

In the accompanying drawings:

Figure 1 is a plan view of my improved check ready for use and without entries thereon;

Fig. 2 is a similar view showing entries thereon and the time of the beginning of the service.

Fig. 3 shows the same at the completion of the service, with the total and time of completion of services stamped thereon; and Fig. 4 shows the receipt portion separated.

Similar reference characters indicate corresponding parts throughout the several figures of the drawings.

Referring to the drawings, and more particularly to Fig. 1 thereof my improved checks comprise a rectangular shaped piece of paper, cardboard or the like, such as is usually used for such checks, and provided either in detached form or in pads in the well known manner.

The check is divided into an upper receipt portion for the customer or guest and a relatively larger body portion for the proprietor of the business, such portions being separated by a transverse line of perforations 8. At the upper portion of the check and within the guest's receipt portion, there is provided a space 1 adapted to contain the name of the business or other suitable advertising matter, and at the lower extremity of the check within the body portion there is provided a space 2 also adapted to contain the name of the business.

Substantially central of the guest's receipt portion a space 3 is blocked out and within this space there is printed the statement "Person served will see that this receipt be separated when paid to keep for future reference," or words of similar intent may be substituted. At the left of the space 3 there is provided a space 4 adapted to contain the title of the person issuing the check, that is, in the case of a store, the word "Salesman or Clerk" would be printed in this space, or in the case of a restaurant, the word "Waiter." Beside this title there is printed a number, as for instance, No. 5, this number designating such person as is usual in such establishments. At the lower end of the body portion there is provided space 5 for the same purpose.

A space 6 is provided beneath space 4 within the guest receipt portion and contains the number of the check. A similar space 7 is provided in the body portion.

A protective band $a$ is printed on the check, preferably in a light color, so that it will not obscure the printed matter or entries upon the check, and this printing is carried out by means of a suitable ink which will readily disclose erasures or changes in the check. In order to lend to the attractiveness of the check this protective band may be in the form of an artistic design, such as shown in the drawings, and if desired, may extend over the whole surface of the check.

In the guest receipt portion is provided a space $b$ containing the word "Name," this space being for the purpose of enabling the customer or guest to sign the check, as for instance, when service rendered is charged against the account of the guest. A similar space $c$ is provided in the lower part of the main portion.

Above the line of perforation 8 there is provided at the left hand side of the check, a space $e$ and at the right hand side of the check, a space $g$, and below said line of perforations there are provided similar spaces $f$ and $h$, the words "Time of services" as at $d$, being printed at the upper edge of the spaces $e$, $g$. The spaces $e$, $f$, are adapted to contain in duplicate and within the guest receipt portions and the main portion respectively, an entry of the time of the beginning of the services, for instance as shown by the entry 5.40 a. m. Fig. 2. This entry may be made either by printing with a suitable time stamping machine, or may be entered in hand writing. Within the spaces $g$, and $h$, the time of completion of the services, as for instance 6.30 a. m. Monday March 25, 1918, as at $u$ $v$ Fig. 3 is adapted to be entered in duplicate respectively, within the guest's receipt portion and the name portion. A central column 9 is provided in the main portion adapted to contain the names of the articles purchased, and at the right of this column there is provided a column $i$ adapted to contain the amounts of the purchase as at $r$ Fig. 2, while on the left of said column there is provided a column $l$ adapted to contain credits. These three columns are provided with transverse line markings or spaces to separate the different items. Within the guest's receipt portion there is provided a space $k$ adapted to contain as at $s$, Fig. 3, the total amount of the purchases, while within the body portion and at the lower end of the column $i$ there is provided a space $j$ also adapted to contain the total as at $t$, Fig. 3. At the lower end of the credit column $l$ there is provided a space $m$ and $f'$ to contain the total of the credits, and below the space $j$ there is provided a space $n$ adapted to contain this credit total, while below the space $n$ there is provided another space $o$ for the final total, that is, the amount actually to be paid when the credits are deducted from the total contained in the space $j$. When such deductions are made, this final total is inserted in the space $k$ of the guest receipt portion. In the illustration shown in the drawings there have been no credits, so that the totals entered in the spaces $j$ and $k$ are the same.

The order of making entries upon the check is as shown in the drawings, that is, the time of beginning the services is first entered in duplicate, as shown in Fig. 2, the purchases are then entered in column 9, whereupon the cashier or other person designated for this purpose enters the amounts in the column $i$, as at $r$ Fig. 2. At the completion of the services and when all credits have been entered, the amounts of the purchases are totaled and the total amount is entered at $j$, and if there are no credits, the same amount is entered in space $k$. Upon paying the check, the time of completion of the services is entered as at $u$ $v$ Fig. 3, and the guest's receipt portion $y$ is thereupon severed from the main portion $z$ as shown in Fig. 4, the said guest's portion being handed to the guest.

I have illustrated and described a preferred and satisfactory embodiment of my invention, but it is obvious that changes may be made therein, within the spirit and scope thereof, as defined in the appended claims.

I claim:

1. A service check for restaurants and the like, comprising a body bearing suitable printed matter defining a guests's receipt portion and a main portion for the proprietor, said check being provided with a line of perforations between said portions, said guests's receipt portion bearing printed matter instructing the guest to retain the same, transverse adjacent portions of the said receipt portion and main portion being disposed at each side of said line of perforations to receive duplicate markings one above the other indicating the time of beginning and completing service, other transverse portions on the main portion and all of said transverse portions extending entirely across said check, the side edges of said check constituting transverse limitations to the said transverse portions for the entry of said time markings and for the entry of separate items on said main portion, spaces appropriately designated for the entry of the total on said main and guest's receipt portions, said guest's receipt and main portions having each a space for a corresponding waiter's number and corresponding spaces for like check numbers, and a protective band extending longitudinally of the face of the check being of less width than the check to provide blank longitudinal rows of spaces at the opposite ends of said transverse portions and at opposite sides of said band.

2. A service check comprising a body portion having a transverse weakened line portion dividing the body portion into a customer's receipt at one end and a proprietor's bill at the other end, said body portion having on its face a centrally located protective band extending throughout the length of the body portion and defining an intermediate article and opposite side credit and debit columns, and having transversely extending marginal lines defining horizontal spaces intersecting the vertical columns, said proprietor's bill having a segregated lower end portion defining blocks upon the face of the bill in which may be placed totals of the respective columns and providing blocks into which may be transferred the totals from one column to the other, whereby differences in totals may be accurately recorded at the foot of the bill, said columns and horizontal spaces providing on said customer's receipt a space wherein may be placed the remainder appearing in said segregated portion of the bill, and providing on said customer's receipt, and on said bill in the protective column thereof, a space for the signature of the customer whereby when said customer's receipt is separated along said weakened line portion from the bill the separated parts may serve as a check one upon the other, and said columns and spaces providing at opposite sides of said weakened line portion adjacent blocks extending across the entire width of the body portion and said intermediate column having in the upper blank thereof directions for placing, in superposed relation in said transverse blocks and in duplicate, the time of commencement and the time of consummation of the transaction, the blank for entry of the time of the consummation of the transaction being arranged in said protective band to prevent alteration of such entry.

In testimony that I claim the foregoing as my invention, I have signed my name.

AUGUST N. E. BOOS.